(12) United States Patent
Kwon et al.

(10) Patent No.: US 7,918,480 B2
(45) Date of Patent: Apr. 5, 2011

(54) ROOF AIRBAG APPARATUS WITH AIRBAG DOOR HAVING LIMITED OPENING ANGLE

(75) Inventors: Hyock In Kwon, Seongnam-si (KR); Hyeong Ho Choi, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/613,875

(22) Filed: Nov. 6, 2009

(65) Prior Publication Data
US 2010/0301591 A1    Dec. 2, 2010

(30) Foreign Application Priority Data

May 27, 2009    (KR) .................. 10-2009-0046358

(51) Int. Cl.
*B60R 21/16*    (2006.01)
(52) U.S. Cl. ............... 280/728.2; 280/730.2; 280/743.2
(58) Field of Classification Search .............. 280/728.3, 280/730.2, 743.2
See application file for complete search history.

(56) References Cited

U.S. PATENT DOCUMENTS

| | | | |
|---|---|---|---|
| 7,210,700 B2 * | 5/2007 | Zagrodnicki et al. | 280/728.3 |
| 7,325,824 B2 * | 2/2008 | Totani et al. | 280/728.2 |
| 7,744,115 B2 * | 6/2010 | Kanno | 280/728.3 |
| 2004/0075251 A1 * | 4/2004 | Fujii et al. | 280/728.3 |
| 2006/0261580 A1 * | 11/2006 | Tiesler et al. | 280/730.2 |
| 2007/0205586 A1 * | 9/2007 | Nishijima et al. | 280/728.3 |
| 2008/0073889 A1 * | 3/2008 | Nakao et al. | 280/730.2 |
| 2008/0238051 A1 * | 10/2008 | Kanno | 280/728.3 |
| 2009/0033073 A1 * | 2/2009 | Kanno | 280/728.3 |
| 2009/0045610 A1 * | 2/2009 | Funakura | 280/728.3 |
| 2010/0140904 A1 * | 6/2010 | Choi et al. | 280/728.3 |

FOREIGN PATENT DOCUMENTS

| KR | 10-0534754 B1 | 12/2005 |
|---|---|---|
| KR | 10-2008-0036393 A | 4/2008 |

* cited by examiner

*Primary Examiner* — Toan C To
(74) *Attorney, Agent, or Firm* — Morgan, Lewis & Bockius LLP

(57) ABSTRACT

A roof airbag apparatus, may include an inflator, a housing mounted to an opening frame provided in a vehicle roof, the opening frame defining an opening therein to receive the housing, an airbag cushion contained in the housing, the airbag cushion being deployed downwards by gas supplied from the inflator to protect a passenger, an airbag door coupled to the housing by a hinge to support the airbag cushion, and angle limiting means for limiting a rotating angle to a predetermined angle when the airbag door is rotated to open.

14 Claims, 6 Drawing Sheets

ROOF AIRBAG APPARATUS WITH AIRBAG DOOR HAVING LIMITED OPENING ANGLE

CROSS-REFERENCE TO RELATED APPLICATIONS

The present application claims priority to Korean Patent Application Number 10-2009-0046358 filed on May 27, 2009, the entire contents of which application is incorporated herein for all purpose by this reference.

BACKGROUND OF THE INVENTION

1. Field of the Invention

The present invention relates generally to a roof airbag apparatus which can reduce passenger injuries and, more particularly, to a roof airbag apparatus which supports an airbag cushion so that the airbag cushion can be smoothly and reliably deployed in a correct direction.

2. Description of Related Art

Generally, airbag systems are classified into a driver seat airbag which protects a driver, a passenger seat airbag which protects a passenger sitting in the passenger seat, and a side airbag and a roof airbag.

Furthermore, such an airbag system includes an impact sensor which senses impact to the vehicle, an airbag controller which determines whether the airbag should be deployed based on information transmitted from the impact sensor, and an airbag module which operates the airbag cushion depending on the determination of the airbag controller. That is, when the impact sensor senses a vehicle collision, the signal is transmitted to the airbag controller. The airbag controller operates an inflator of the airbag module, so that the airbag cushion is instantaneously inflated to protect a passenger in the case of impact.

However, in the conventional techniques, in the case where the volume of the airbag cushion is relatively small, when the passenger strikes the deployed airbag cushion, the airbag cushion may be torn by shear force, or it may not effectively absorb impact energy because it is deployed or rotated in an incorrect direction.

Furthermore, in the case where the volume of the airbag cushion is relatively large, an area over which the airbag cushion comes into contact with the vehicle roof is sufficiently large, so that the airbag cushion can be prevented from being torn or rotating. However, to increase the volume of the airbag cushion, the capacity of the inflator as well as the airbag cushion is increased, with the result that the weight of the product and the production cost are increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a roof airbag apparatus which is configured such that an airbag door guides deployment of an airbag cushion, thus effectively absorbing impact energy despite minimizing the volume of the airbag cushion.

In an aspect of the present invention, the roof airbag apparatus may include an inflator, a housing mounted to an opening frame provided in a vehicle roof, the opening frame defining an opening therein to receive the housing, an airbag cushion contained in the housing, the airbag cushion being deployed downwards by gas supplied from the inflator to protect a passenger, an airbag door coupled to the housing by a hinge to support the airbag cushion, and angle limiting means for limiting a rotating angle to a predetermined angle when the airbag door is rotated to open.

The hinge may be monolithically formed to the airbag door to elastically support the airbag cushion to the housing, wherein the hinge is formed of a semicircular shape.

A reinforcing member may be provided on the airbag door and reinforces the hinge of the airbag door to prevent the airbag door from being damaged.

The predetermined angle at which the airbag door is rotated to open may be within a range of an acute angle.

The angle limiting means may include a stopper protruding from the airbag door, the stopper coming into contact with the opening frame to stop the airbag door when the airbag door is rotated beyond the predetermined angle.

In another aspect of the present invention, the angle limiting means may include a tether connected between the airbag door and the opening frame, wherein the tether is connected between a side perimeter of the airbag door and a side perimeter of the opening frame to prevent the airbag cushion from being disturbed by the tether when the airbag cushion is deployed towards the passenger and wherein a first hook is provided on the airbag door, and a second hook is provided on the opening frame, first and second ends of the tether being respectively connected to the first hook and the second hook.

In further another aspect of the present invention, the angle limiting means may include a tether connected between the airbag door and the housing, wherein a first hook is provided on the airbag door, and a second hook is provided on the housing, first and second ends of the tether being respectively connected to the first hook and the second hook.

The housing may be provided in the vehicle roof in an area between a front seat and a rear seat, and the airbag cushion is deployed toward a passenger who is sitting on the rear seat.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
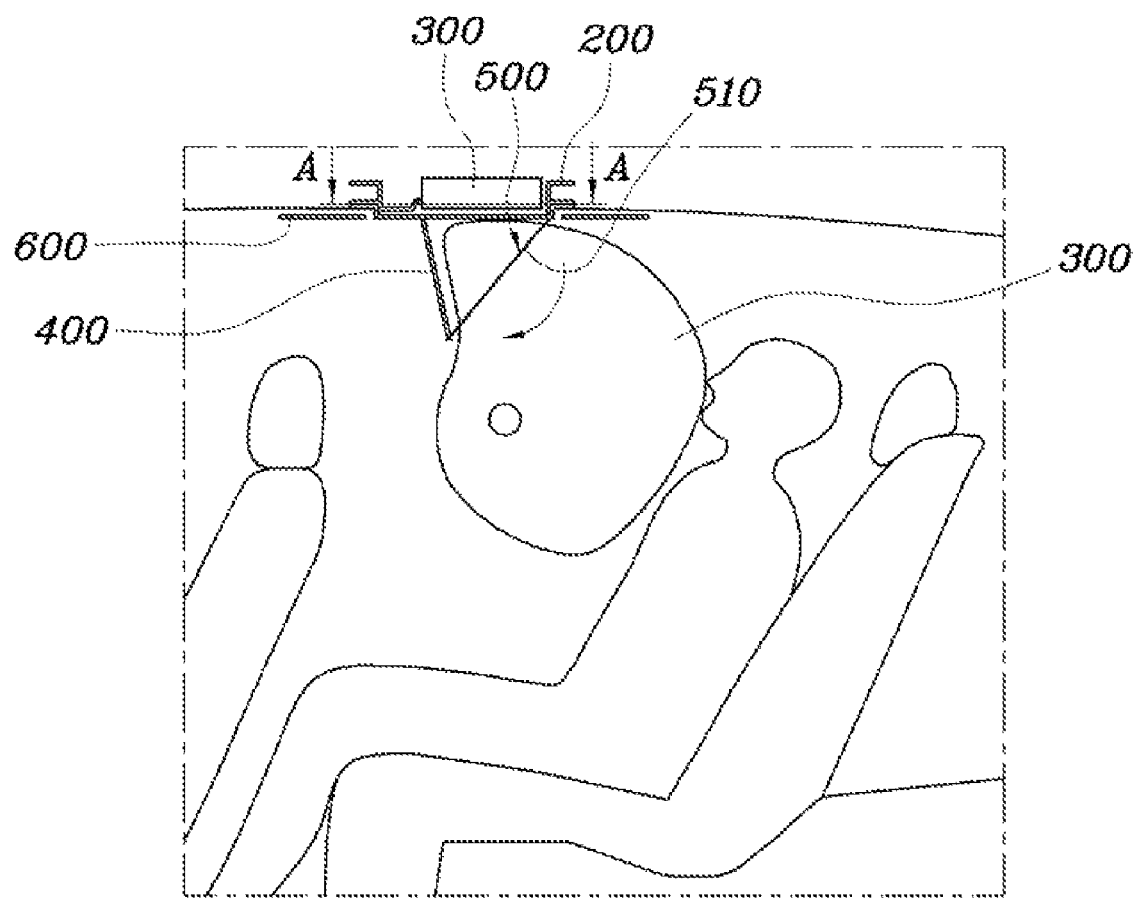
FIG. 1 is a view showing the installation of a roof airbag apparatus with an airbag door having a limited opening angle, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, various exemplary embodiments of the present invention will be described in detail with reference to the attached drawings.

Figure 2A:
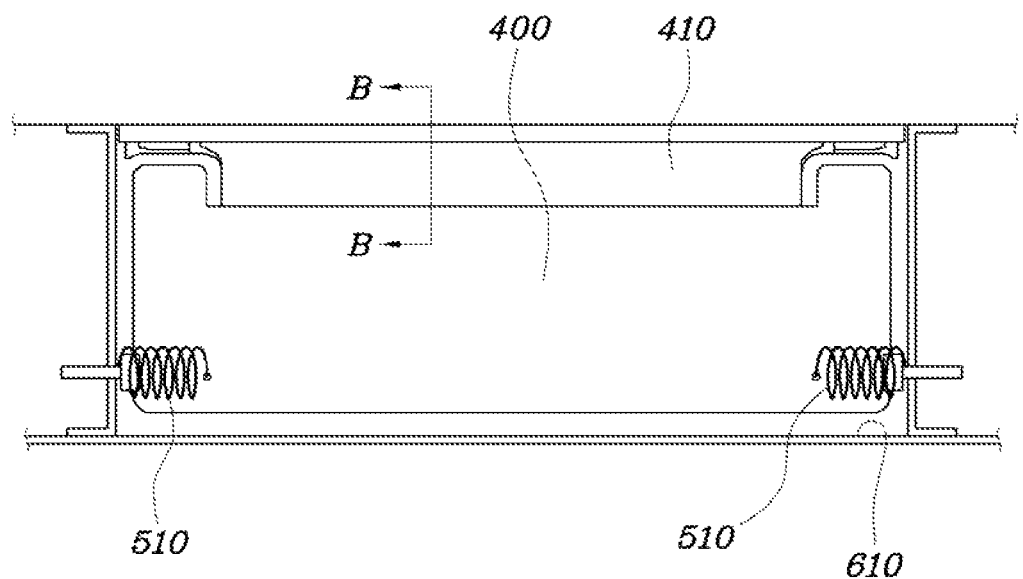
FIG. 2A is a plan view taken along the line "A-A" of FIG. 1, according to an exemplary embodiment of the present invention.
Figure 2B:
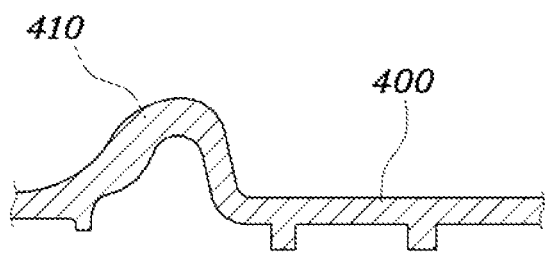
FIG. 2B is a sectional view taken along the line "B-B" of FIG. 2A.

As shown in FIGS. 1 through 2B, a roof airbag apparatus according to an exemplary embodiment of the present invention includes an airbag cushion 300, a housing 200 which contains the airbag cushion 300 therein, an airbag door 400 which is coupled to the housing 200 by a hinge 410, and an angle limiting means 500 which limits an angle at which the airbag door 400 is opened.

The housing 200 is installed in an opening frame 610 which is formed in a vehicle roof 600 and defines an opening through which the airbag cushion 300 is deployed outwards. In detail, the opening frame 610 is formed in the vehicle roof 600 in a predetermined area between the front seats and the rear seats. The airbag cushion 300 is contained in the housing 200. Furthermore, the airbag door 400 is coupled to the housing 200 so as to be rotatable around the hinge 410 such that when a vehicle collision occurs, the airbag cushion 200 can be deployed towards a passenger.

The airbag cushion 300 is configured such that it can be deployed downwards by gas supplied from the inflator to protect the passenger. The airbag cushion 300 is able to open the airbag door 400 of the housing 200 using inflation pressure generated by gas of the inflator. Here, an airbag cushion having a relatively small volume is used as the airbag cushion 300, unlike the conventional technique which requires the airbag cushion 300 having a relatively large volume. Thereby, the weight of the product and the production cost can be reduced.

The inflator is connected to the airbag cushion 300 to provide deployment force to the airbag cushion 300. The inflator may be disposed in the housing 200 or, alternatively, it may be mounted to an outer frame of the housing 200 and connected to the airbag cushion 300 through a gas supply pipe.

When the airbag cushion 300 is inflated after a vehicle collision, the direction in which the airbag cushion 300 is deployed is guided by the airbag door 400. The airbag door 400 is coupled to the housing 200 by the hinge 410 such that the airbag cushion 300 that is being deployed can be supported by the airbag door 400. The angle limiting means 500 is provided on the front end of the airbag door 400 to limit the angle at which the airbag door 400 opens. It is preferable that the angle at which the airbag door 400 rotates be limited to within a range of an acute angle by the limiting means 500.

In an exemplary embodiment of the present invention, the hinge 410 may be monolithically formed to the airbag door 400 to elastically support the airbag cushion 300 to the housing 200 wherein the hinge 410 may be formed of a semicircular shape.

Figure 3A:
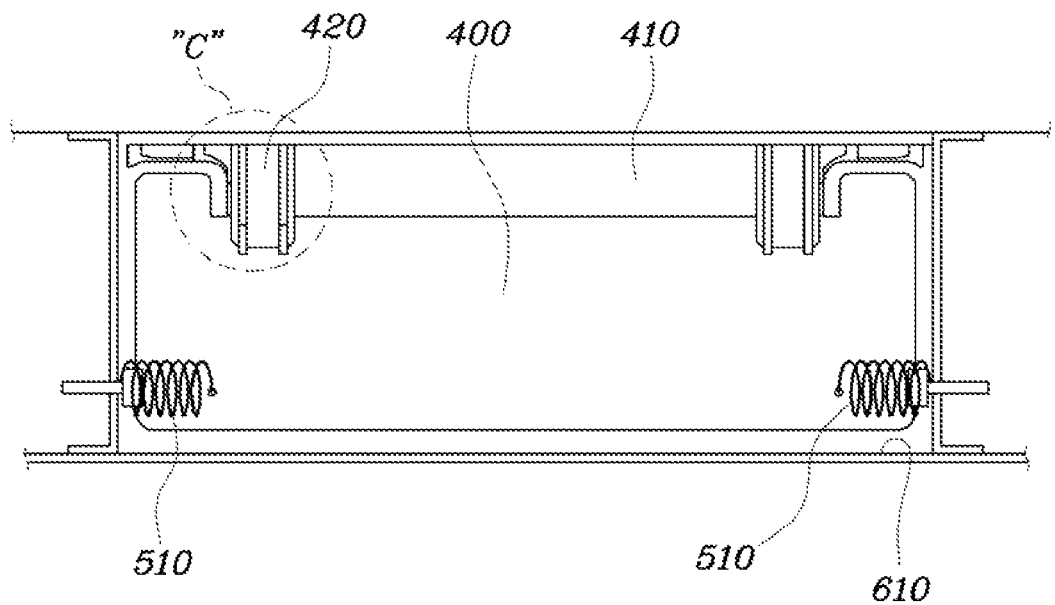
FIG. 3A is a plan view taken along the line "A-A" of FIG. 1, according to an exemplary embodiment of the present invention.
Figure 3B:
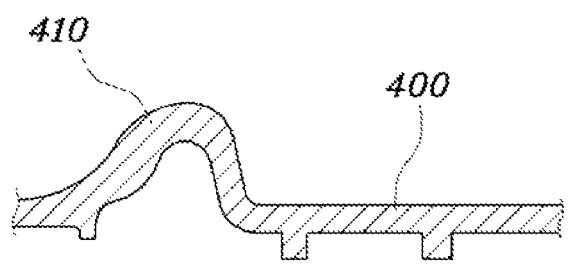
FIG. 3B is an enlarged view of a circled portion "C" of FIG. 3A.

As shown in FIGS. 3A and 3B, a reinforcing member 420 may be provided on the airbag door 400 to reinforce the structure of the hinge 410 of the airbag door 400. In addition, a reinforcing rib may be provided in the opening frame 610.

The reinforcing member 420 and the reinforcing rib prevent the airbag door 400 and the opening frame 610 corresponding to the airbag door 400 from being torn or damaged by the deployment force of the airbag cushion 300 when the airbag cushion 300 is deployed.

Meanwhile, the angle limiting means 500 limits the angle at which the airbag door 400 rotates when the airbag cushion 300 is deployed. Hereby, the airbag door 400 can reliably guide the airbag cushion 300 such that it is deployed in a correct direction. For this, the angle limiting means 500 includes tethers 510 which connect the airbag door 400 to the opening frame 610 of the vehicle roof 600.

The tethers 510 are coupled at first ends thereof to the front end of the airbag door 400 and coupled at second ends thereof to the opening frame 610 of the vehicle roof 600. The tethers 510 function to limit the angle at which the airbag door 400 is opened. Preferably, the tethers 510 are coupled between the left and right side perimeters of the airbag door 400 and the left and right side perimeters of the opening frame 610 to prevent it from disturbing the deployment of the airbag cushion 300.

Figure 4A:
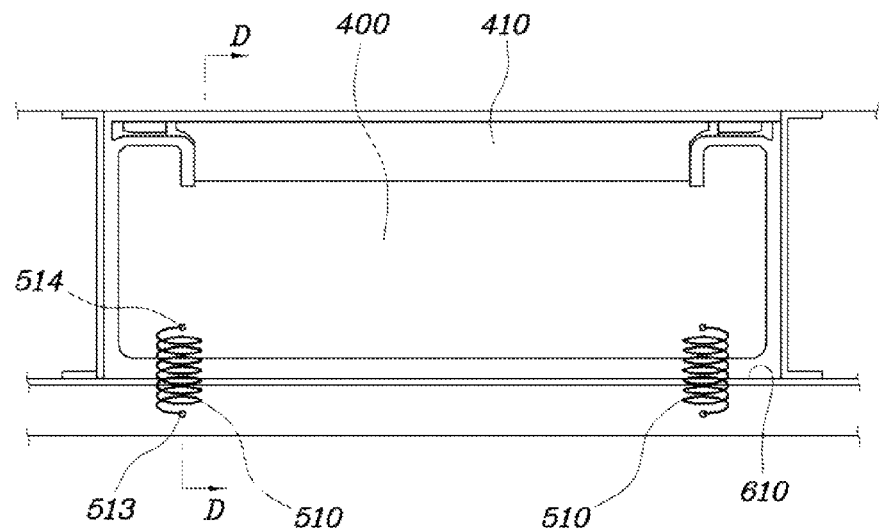
FIG. 4A is a plan view taken along the line "A-A" of FIG. 1, according to an exemplary embodiment of the present invention.

Of course, as shown in FIG. 4A, the tethers 510 may be coupled between the corners of the front end of the airbag door 400 and the corners of the front end of the opening frame 610. In such a connection structure, the tethers 510 must not disturb the deployment of the airbag cushion 300.

To achieve the above purpose, for example, first coupling holes 513 are formed in the front end of the airbag door 400 so that the first ends of the tethers 510 are fastened to the first coupling holes 513. Second coupling holes 514 are formed in the front end of the opening frame 610 corresponding to the front end of the airbag door 400 so that the second ends of the tethers 510 are fastened to the second coupling holes 514.

Figure 4B:
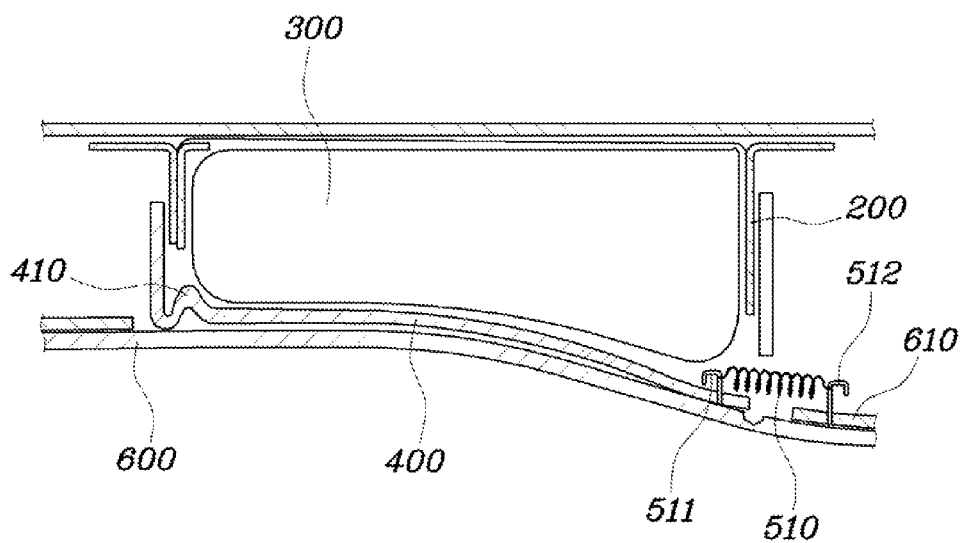
FIG. 4B is a plan view taken along the line "D-D" of FIG. 4A, showing hooks according to an exemplary embodiment of the present invention.

Alternatively, first hooks 511 may be provided on the corners of the front end of the airbag door 400 to hold the first ends of the tethers 510, and second hooks 512 may be provided on the corners of the front ends of the opening frame 610 as shown in FIG. 4B.

Figure 4C:
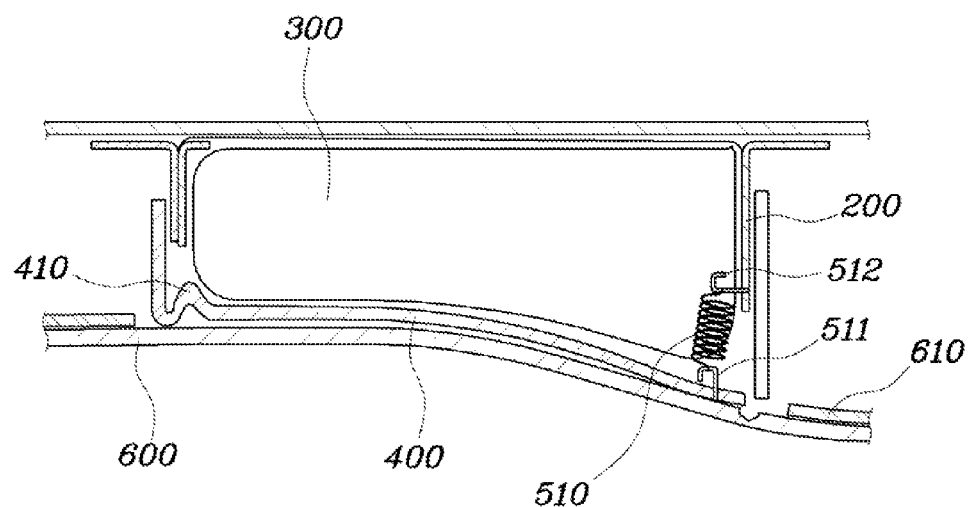
FIG. 4C are a plan view showing hooks added to tether connecting the airbag door and the housing according to exemplary embodiments of the present invention.

In another exemplary embodiment of the present invention, first hooks 511 may be provided on the corners of the front end of the airbag door 400 to hold the first ends of the tethers 510, and second hooks 512 may be provided on the corners of the housing 200 corresponding to the corners of the front ends of the airbag door 400 to hold the second ends of the tethers 510 as shown in FIG. 4C.

Due to the hook shape, the first and second hooks 511 and 512 facilitate the fastening of both ends of the tethers 510.

As such, the tethers 510 may be directly fastened to the front end of the airbag door 400 and the front end of the opening frame 610 through the first and second coupling holes 513 and 514 without using the first and second hooks 511 and 512. Alternatively, the tethers 510 may be fastened to the front end of the airbag door 400 and the front end of the opening frame 610 or the housing 200 using the first and second hooks 511 and 512.

Figure 5:
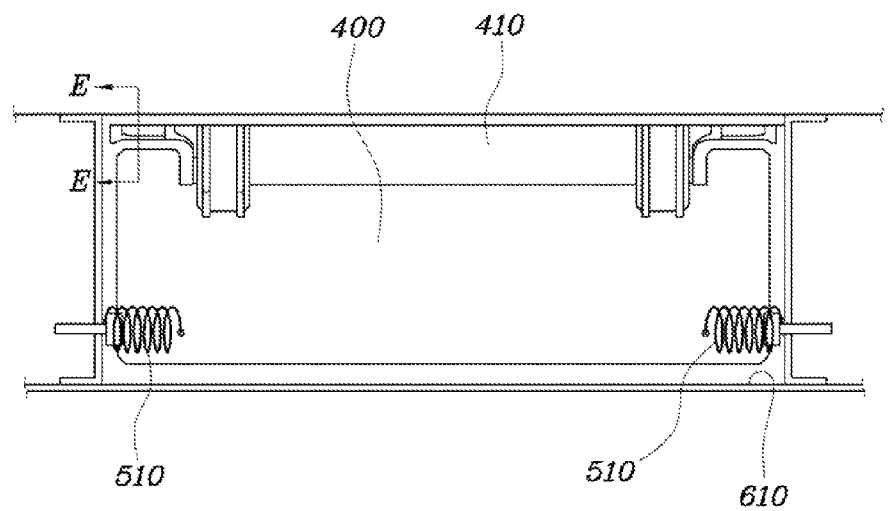
FIG. 5 is a plan view taken along the line "A-A" of FIG. 1, according to an exemplary embodiment of the present invention.
Figure 6A:
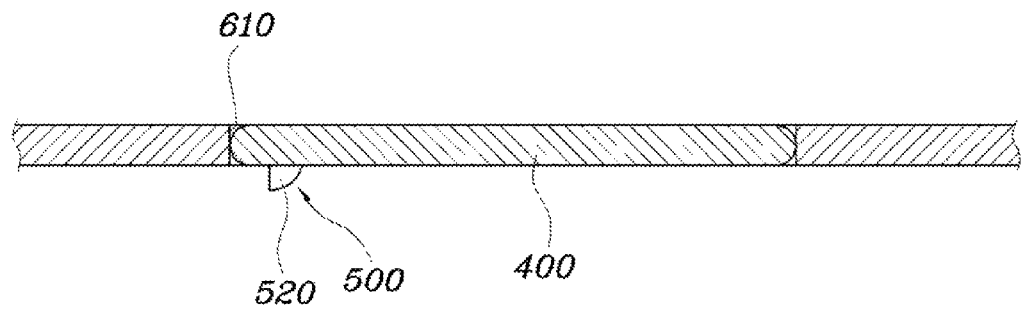
FIG. 6A is a sectional view taken along the line "E-E" of FIG. 5.
Figure 6B:
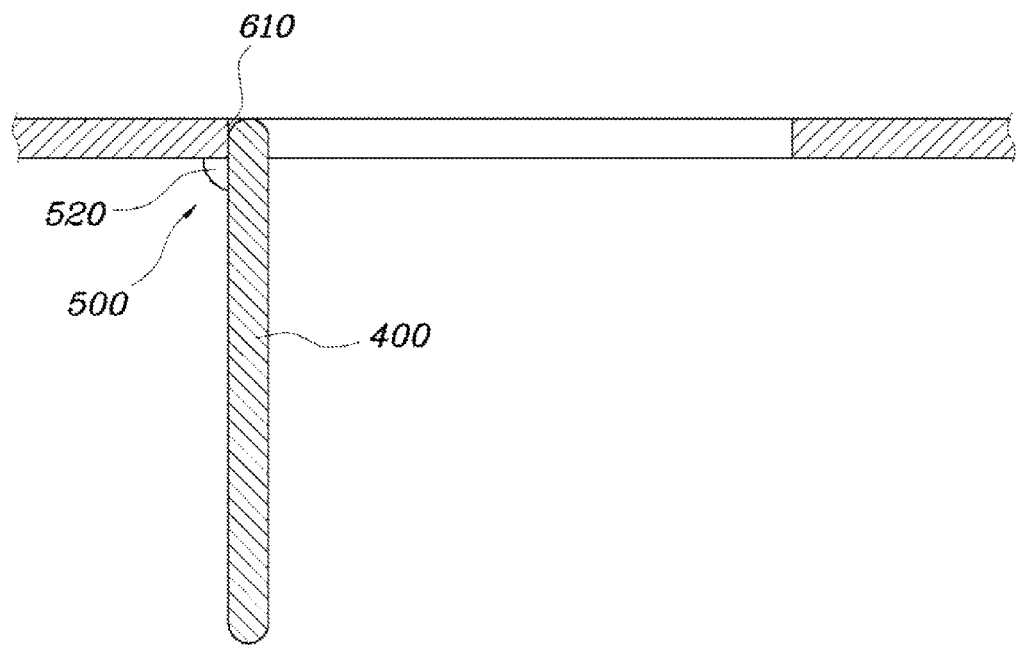
FIG. 6B is a view showing the operation of rotating the airbag door which has been in the state of FIG. 6A.

As shown in FIGS. 5 through 6B, the angle limiting means 500 may have a stopper 520 which protrudes from the surface of the airbag door 400, so that after the airbag door 400 rotates by a predetermined angle, the airbag door 400 is stopped by the opening frame 610.

In detail, the stopper 520 protrudes outwards from the surface of the airbag door 400 at a position adjacent to the hinge 410. When the airbag door 400 is opened, the stopper 520 comes into contact with the opening frame 610, thus limiting the angle at which the airbag door 400 is opened. At this time, the direction in which the airbag cushion 300 is deployed is guided by the airbag door 400 that has opened by a limited angle. As a result, the deployment of the airbag cushion can be reliably and smoothly conducted, thus preventing the airbag cushion from injuring the passenger.

As described above, in the present invention, because an angle at which an airbag door is opened is limited to a predetermined angle, an airbag cushion can be reliably and smoothly deployed in a correct direction through the airbag door, thus preventing the airbag cushion from injuring the passenger.

Furthermore, in the present invention, the airbag cushion can effectively absorb impact energy despite having a relatively small volume. The reduction in volume of the airbag cushion reduces the weight of the product and the production cost.

For convenience in explanation and accurate definition in the appended claims, the terms "front", "rear", "left", and "right" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roof airbag apparatus, comprising:
    an inflator;
    a housing mounted to an opening frame provided in a vehicle roof, the opening frame defining an opening therein to receive the housing;
    an airbag cushion contained in the housing, the airbag cushion being deployed downwards by gas supplied from the inflator to protect a passenger;
    an airbag door coupled to the housing by a hinge to support the airbag cushion; and
    angle limiting means for limiting a rotating angle to a predetermined angle when the airbag door is rotated to open.

2. The roof airbag apparatus as set forth in claim 1, wherein the hinge is monolithically formed to the airbag door to elastically support the airbag cushion to the housing.

3. The roof airbag apparatus as set forth in claim 2, wherein the hinge is formed of a semicircular shape.

4. The roof airbag apparatus as set forth in claim 1, wherein a reinforcing member is provided on the airbag door and reinforces the hinge of the airbag door to prevent the airbag door from being damaged.

5. The roof airbag apparatus as set forth in claim 1, wherein the predetermined angle at which the airbag door is rotated to open is within a range of an acute angle.

6. The roof airbag apparatus as set forth in claim 1, wherein the angle limiting means comprises a stopper protruding from the airbag door, the stopper coming into contact with the opening frame to stop the airbag door when the airbag door is rotated beyond the predetermined angle.

7. The roof airbag apparatus as set forth in claim 1, wherein the angle limiting means comprises a tether connected between the airbag door and the opening frame.

8. The roof airbag apparatus as set forth in claim 7, wherein the tether is connected between a side perimeter of the airbag door and a side perimeter of the opening frame to prevent the airbag cushion from being disturbed by the tether when the airbag cushion is deployed towards the passenger.

9. The roof airbag apparatus as set forth in claim 7, wherein a first hook is provided on the airbag door, and a second hook is provided on the opening frame, first and second ends of the tether being respectively connected to the first hook and the second hook.

10. The roof airbag apparatus as set forth in claim 7, wherein the angle limiting means further comprises a stopper protruding from the airbag door, the stopper coming into contact with the opening frame to stop the airbag door when the airbag door is rotated by the predetermined angle.

11. The roof airbag apparatus as set forth in claim 1, wherein the angle limiting means comprises a tether connected between the airbag door and the housing.

12. The roof airbag apparatus as set forth in claim 10, wherein a first hook is provided on the airbag door, and a second hook is provided on the housing, first and second ends of the tether being respectively connected to the first hook and the second hook.

13. The roof airbag apparatus as set forth in claim 11, wherein the angle limiting means further comprises a stopper protruding from the airbag door, the stopper coming into contact with the opening frame to stop the airbag door when the airbag door is rotated by the predetermined angle.

14. The roof airbag apparatus as set forth in claim 1, wherein the housing is provided in the vehicle roof in an area between a front seat and a rear seat, and the airbag cushion is deployed toward a passenger who is sitting on the rear seat.

* * * * *